United States Patent [19]
Sakakibara et al.

[11] 3,722,614
[45] Mar. 27, 1973

[54] METHOD AND APPARATUS FOR CAUSING CONSTANT TRAVELING SPEED OF AUTOMOTIVE VEHICLES

[75] Inventors: Naoji Sakakibara; Yasuhiro Kawabata; Korehiko Tsukuba, all of Kariya, Japan

[73] Assignee: Aisin Seiki Kaisha, Kariya-shi, Japan

[22] Filed: Aug. 5, 1970

[21] Appl. No.: 61,373

[30] Foreign Application Priority Data

Aug. 6, 1969 Japan ..............................44/62164
Aug. 9, 1969 Japan ..............................44/63168

[52] U.S. Cl. .................180/105 E, 317/5, 123/102
[51] Int. Cl. ...................................................B60k 31/00
[58] Field of Search ...180/105, 110; 317/5; 246/182; 318/599, 600, 603, 329, 326; 123/102

[56] References Cited

UNITED STATES PATENTS

| | | | |
|---|---|---|---|
| 3,340,951 | 9/1967 | Vitt | 180/106 |
| 3,511,329 | 5/1970 | Wisner | 180/105 |
| 3,153,746 | 10/1964 | Atkinson | 180/105 |
| 3,207,255 | 9/1965 | Hahlganss et al. | 317/5 X |
| 3,301,269 | 1/1967 | Marwood | 317/5 X |
| 3,401,321 | 9/1968 | Miki | 318/314 X |
| 3,346,771 | 10/1967 | Sutton | 317/5 |
| 3,409,102 | 11/1968 | Neapolitakis et al. | 180/109 |
| 3,575,256 | 4/1971 | Jania et al. | 180/105 |

*Primary Examiner*—Kenneth H. Betts
*Attorney*—Holman & Stern

[57] ABSTRACT

A method and an apparatus for causing constant traveling speed of automotive vehicles, in which the travelling speed of a vehicle is sensed as a pulse width, this pulse width is compared with a pulse width corresponding to a adjustable predetermined desired value, thereby to produce a difference pulse width, and a servomotor is driven for a period of time proportional to said difference pulse width. The method and apparatus utilize further a system which actuates so that when variation of the vehicle speed occurs after determination of a predetermined speed, this predetermined speed is temporarily varied within a suitable range in response to magnitude of the speed variation in such a manner that difference between the actual speed and the predetermined speed of the vehicle becomes large. Furthermore, a servo-motor mechanism adapted to the method and apparatus is disclosed.

6 Claims, 32 Drawing Figures

METHOD AND APPARATUS FOR CAUSING CONSTANT TRAVELING SPEED OF AUTOMOTIVE VEHICLES

BACKGROUND OF THE INVENTION

The present invention relates to a method and an apparatus for causing constant traveling speed of automotive vehicles.

In the conventional system adapted to cause constant traveling speed of automotive vehicles, there is provided a pulse width comparing means which is constructed and utilized so that an electric power proportional to a pulse width corresponding to an adjustable predetermined speed and another electric signal proportional to an actual traveling speed are applied, respectively, to a winding adapted to deenergize a motor for opening and closing a throttle valve and to another to a winding adapted to energize said motor and when the current passing through one of said windings flows for a period of time longer than that of the current passing through another winding, and said throttle valve is opened or closed in response to difference between the durations of said currents. According to the conventional systems mentioned above, even though the actual traveling speed of the vehicle is in coincidence with the predetermined speed, currents flow always through both windings, thus causing disadvantageously large waste of electric power and unfavorable heating of the windings.

Furthermore, in the conventional methods and apparatus adapted to cause constant traveling speed of automotive vehicles, a mechanical system for memorizing a vehicle speed by affixing reaction spring force of a centrifugal governor has been used as a vehicle speed memorizing means. This system, however, has disadvantages in that its frictional parts are many, errors are liable to occur in the memorized vehicle speed with the lapse of time, and a nonresponsive region occurs in the electric control means because a result obtained by digitally detecting traveling speed of the vehicle is used for controlling after said result has been converted to an analogue voltage, thus deteriorating the control performance.

SUMMARY OF THE INVENTION

An essential object of the invention is to provide a method and apparatus for causing constant traveling speed of automotive vehicles without the drawbacks associated with known and conventional systems. In the method of the instant invention, the travelling speed of the vehicle is sensed and taken out as a pulse width, and the pulse width so taken out is compared with a pulse width corresponding to an adjustable predetermined speed thereby to produce a difference pulse width between the compared pulse widths. A servo-motor having correcting windings is then driven for a period of time proportional to said difference pulse width so as to correct any erroneous speed variation occuring in the actual vehicle speed; this is done by feeding an electric current signal into only a selected of said correcting windings. The magnitude of said electric current signal is made to be larger for larger deviations of the vehicle speed with respect to the reference speed; notwithstanding, an electric current signal is unfailingly produced even for minor speed variations of the motor vehicle. Thus, wastage of electric power is avoided during non-responsive durations of operation and in addition, the durability of said correcting windings and associated components is improved. An extremely accurate control of the vehicle speed is made possible by the instant invention, and any hunting phenomenon due to existence of non-responsive regions in the speed control operation is effectively eliminated.

It is another object of the present invention to provide a method and an apparatus for causing constant traveling speed of automotive vehicles, wherein a vehicle speed memorizing means provided with no movable members and a control means utilizing pulse train are used, whereby durability, dependability and accuracy of the apparatus are made excellent, and furthermore a control current for controlling a throttle valve control device is made to flow only when any difference occurs between an actual vehicle speed and a predetermined speed as in the case when the vehicle travels an ascending slope or a decending slope, thus causing decrease of power loss due to control current otherwise constantly passing through said control device.

It is still another object of the present invention to provide a method and an apparatus for causing constant traveling speed of automotive vehicles, wherein when the vehicle speed deviates from a previously set predetermined speed, the difference between the actual speed and said predetermined speed is made to increase in response to said deviation degree, whereby sure and rapid restoration of the vehicle speed to the predetermined speed is effectively secured even when a slight deviation of the vehicle speed occurs, thus preventing the control device from being subjected to the so-called hunting phenomenon.

With the above-mentioned and other objects in view, which will become apparent in the following detailed description, the present invention will be clearly understood from the following description read in conjunction with the accompanying drawings, in which the same or equivalent members are indicated by the same reference numerals.

BRIEF DESCRIPTION OF THE DRAWINGS

FIGS. 4a to 4d show diagrams for explaining a sequence in which the actual vehicle speed is greater than a predetermined vehicle speed;

FIGS. 5a to 5d show diagrams for explaining a sequence in which the actual vehicle speed is smaller than a predetermined vehicle speed;

FIGS. 11a to 11h illustrate schematic diagram for explaining the function of the circuit shown in FIG. 10, in the case when the actual vehicle speed is greater than a predetermined vehicle speed; and FIGS. 12a to 12g illustrate schematic diagrams for explaining the function of the circuit shown in FIG. 10, in the case when the actual vehicle speed is smaller than a predetermined vehicle speed.

DETAILED DESCRIPTION OF THE INVENTION

Figure 1:
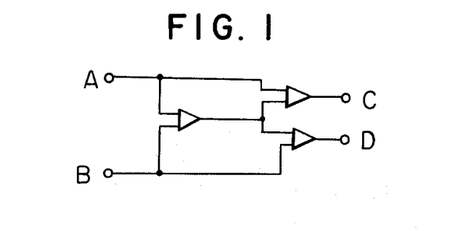
FIG. 1 is a logic circuit diagram of the invention.

Referring now to the drawings, and in particular to the logic circuit diagram of FIG. 1; in this circuit, a pulse current A responsive to the actual vehicle speed and a pulse current B responsive to a predetermined vehicle speed are introduced into a comber circuit consisting of NAND circuits, whereby an erroneous signal of the vehicle speed and magnitudes C and D of the error are respectively led out at output terminals. As clear from the following modification of the logic equations corresponding to the logical circuit mentioned above $$C: \rightarrow \overline{A \cdot (\overline{A \cdot B})} = \overline{A \cdot (\overline{A} + \overline{B})} = \overline{A \cdot \overline{A} + A \cdot \overline{B}} = \overline{A \cdot \overline{B}}$$

$$D: \rightarrow \overline{B \cdot (\overline{A \cdot B})} = \overline{B \cdot (\overline{A} + \overline{B})} = \overline{B \cdot \overline{A} + B \cdot \overline{B}} = \overline{B \cdot \overline{A}}$$

Figure 2:
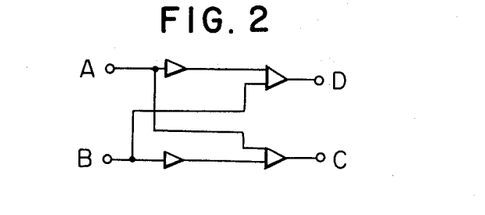
FIG. 2 is another logic circuit diagram of the invention.

If the circuit is constructed so as to lead out $\overline{A \cdot \overline{B}}$ and $\overline{B \cdot \overline{A}}$ as logical outputs of the pulse currents A and B, and similar effects can be obtained even if the circuit composition is somewhat modified. Circuit of FIG. 2 shows the fact that the same result as the circuit of FIG. 1 can be obtained by combination of a NOT circuit and a AND circuit. The circuit of FIG. 2 can be represented by the following logical equations.

$$C: \rightarrow \overline{A \cdot \overline{B}}$$

$$D: \rightarrow \overline{B \cdot \overline{A}}$$

Accordingly, the result of the circuit of FIG. 2 becomes equal to that of the circuit of FIG. 1.

Figure 3:
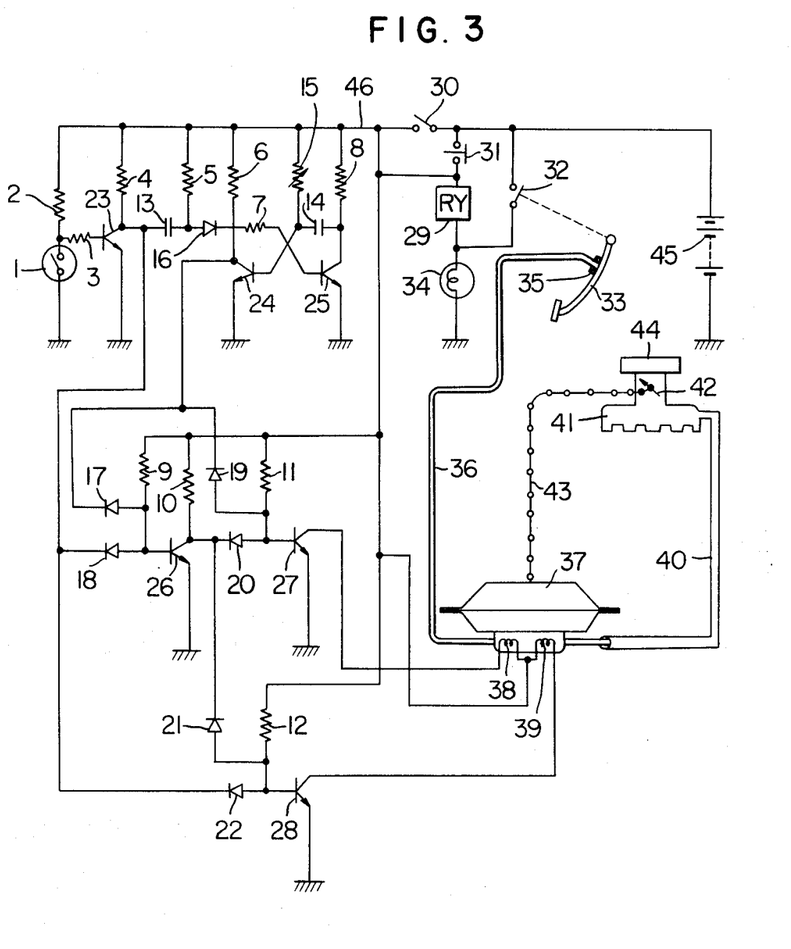
FIG. 3 is an electric circuit diagram according to the invention.

Referring to FIG. 3, a pulse generator 1 functions to open and close a switch in response to rotation of a speed meter. Alternatively, where available the ignition points (not shown) may be used in place of the pulse generator. The circuit of FIG. 3 comprises nonvariable resistors 2 to 12, capacitors 13 and 14, a variable resistor j5 for setting a predetermined vehicle speed, diodes 16 to 22, and transistors 23 to 28, said transistor 23 functioning as an invertor. The capacitor 13 and resistor 5 constitute a differential circuit and output of said circuit is utilized for driving, through the trigger diode 16, a mono-multivibrator consisting of the transistors 24, 25, capacitor 14, resistors 6, 7, and 8, and variable resistor 15. Furthermore, the diodes 17, 18, transistor 26, resistors 9, 10, diodes 19, 20, resistor 11, transistor 27, diodes 21, 22, resistor 12, and transistor 28 compose, respectively, two NAND circuits. The circuit of FIG. 3 comprises further a relay 29 having a normally opened contact 30, a normally opened push button 31 for issuing a signal corresponding to a predetermined vehicle speed, a stop switch 32 which is closed by treading a brake pedal 33 thereby to illuminate a stop lamp 34, a valve 35 which is opened when the brake pedal is trodden, a vacuum servo-device 37 communicating with said valve 35 through a conduit 36, coils 38 and 39 provided in said vacuum servo-device and supplied with a current when the transistors 27 and 28 are brought in conductive state, a conduit 40 for interconnecting the vacuum servo-device 37 with an intake manifold 41, an air cleaner 44, a battery 45, a plus bus line 46, and a throttle valve 42, said throttle valve being opened or closed by means of a pedal and also by means of the vacuum servo-device 37 through a chain 43.

Figure 6:
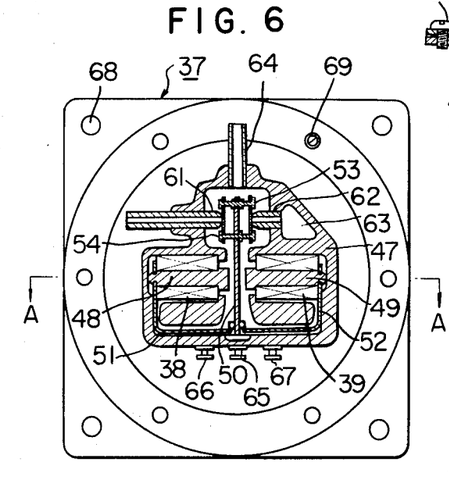
FIG. 6 is a cross-sectional view of a servo-mechanism according to the invention.
Figure 7:
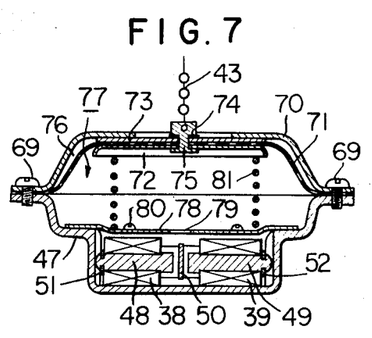
FIG. 7 is a sectional view along line A—A in FIG. 6.
Figure 8:
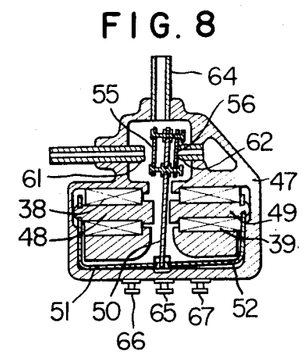
FIG. 8 is a sectional view showing part of the servo-mechanism shown in FIGS. 6 and 7.
Figure 9:
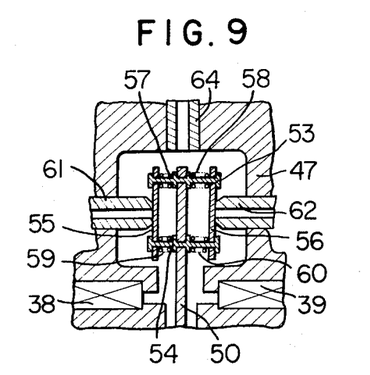
FIG. 9 is an enlarged view of a principal part of the servo-mechanism shown in FIGS. 6 and 7.

Referring now to FIGS. 6, 7 and 8 showing details of the vacuum servo-device 37, this servo-device comprises a main housing 47, coils 38 and 39 provided in said housing and having, respectively, iron cores 48 and 49 provided at the central part thereof. Between the iron cores 48 and 49, there is provided a magnetic plate 50 made of a magnetic material such as iron, and L-shaped iron plates 51 and 52 are caulked to other ends of said iron cores 48 and 49, other ends of said iron plates being rotatably supported by end portion of the magnetic plate 50 and forming a magnetic circuit. Furthermore, rivets 53 and 54 are caulked to the magnetic plate 50 and valve plates 55 and 56 are fitted in said revets 53 and 54 so that said valve plates can move in the states of forming a parallelogram, said valve plates being always kept away from the magnetic plate 50 by means of weak springs 57, 58, 59, and 60 provided therebetween.

The vacuum servo-device 37 comprises further a vacuum-side nozzle 61 connected with the intake manifold 41 through the conduit 40, an air-side nozzle 62 connected to the atmosphere through an air cleaner 63, a cylinder 64 communicating with the conduit 36, a common terminal 65 of the coils 38 and 39, a terminal 66 connected to other end of the coil 38, a terminal 67 connected to other end of the coil 39, bolt holes 68 for mounting the vacuum servo-device 37, screws 69 for fixing a diaphragm cover 70, and a diaphragm 71. The periphery of the diaphragm 71 is clamped between the main housing 47 and the diaphragm cover 70, and the diaphragm 71 itself is clamped by means of a rivet 75 together with a pressure plate 72, a retainer plate 73 and a washer 74 located at the position inside the cover 70. An air chamber 76 and a vacuum chamber 77 are provided, respectively, at both sides of the diaphragm 71 and the chain 43 is attached to the rivet 75. A plate 78 having a hole 79 is attached to the housing 47 by means of a screw 80, whereby positioning of a compression spring 81 stretched between said plate 78 and the pressure plate 72 is secured.

Figure 4A:
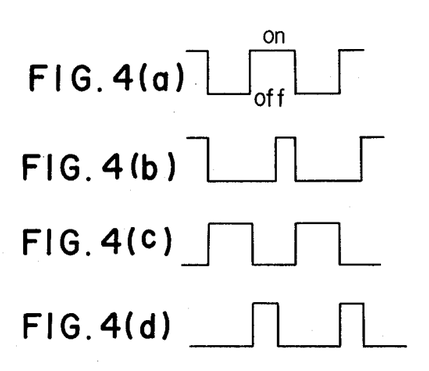
Figure 5A:
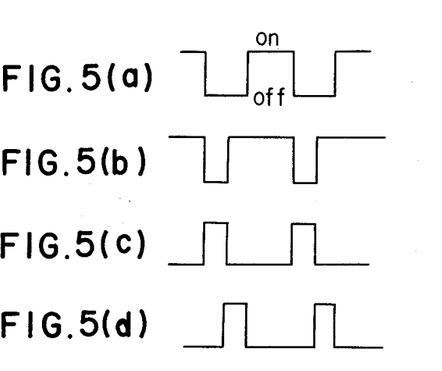

Operation of the apparatus mentioned above will now be explained hereinbelow. When the operator sets the vehicle speed at a desired predetermined speed by adjusting the variable resistor 15 while viewing a dial graduation and then pushes temporarily the switch 31 provided for traveling the vehicle with a constant speed, the relay 29 operates thereby to close its self-holding contact 30, so that even if the switch 31 is released, the relay 29 continues to operate, thus feeding electric power to the bus line 46. The current passing through the relay 29 passes through the stop lamp 34, but the current necessary for operating the relay 29 is extremely small and accordingly the stop lamp 34 does not illuminate, and further the relay 29 operates sufficiently as the internal resistance of the stop lamp 34 is low. As mentioned above, when a current is made to pass through the bus line 46 and the vehicle is maintained at traveling state, a pulse having a width corresponding to the vehicle speed is produced by the pulse generator 1. On the other hand, upon closing of the pulse generator 1 base current of the transistor 23 ceases and said transistor is cut off, but upon opening of the pulse generator 1 said base current commences to flow thereby to bring said transistor 23 into its conductive state. The above-mentioned opening and closing of the transistor 23 are repeated in response to the traveling speed of the vehicle, whereby signalling pulses responsive to the vehicle speed, such as shown in FIGS. 4 and 5, are produced, the width of each of said pulses being narrower or wider in inverse proportion to the vehicle speed. When the transistor 23 is cut off, a pulse current adapted to cause conductive state of the transistor 25 of the multivibrator is led out from the differential circuit comprising the capacitor 13, resistor 5 and diode 16, whereby the transistor 25 is made conductive during only a period of time set by means of the capacitor 14 and variable resistor 15. Upon transistor 25 becoming conductive, the transistor 24 is cut off, whereby the transistors 23 and 24 are simultaneously brought into nonconductive states. In this case, however, the transistor 23 is cut off during a period of time corresponding to the actual vehicle speed, but the transistor 24 is cut off during a period of time corresponding to the predetermined vehicle speed determined by the variable resistor 15. Consequently, when the cut-off time of the transistor 23 is equal to that of the transistor 24, the actual vehicle speed is in coincidence with predetermined vehicle speed. On the other hand, if the cut-off time of the transistor 23 is greater than that of the transistor 24, the actual vehicle speed becomes slower than the predetermined vehicle speed, and if the cut-off time of the transistor 23 is smaller than that of the transistor 24, the actual vehicle speed becomes faster than the predetermined vehicle speed. As mentioned above, when outputs of the transistors 23 and 24 are introduced into a NAND circuit consisting of the diodes 17, 18, resistors 9, 10, and the transistor 26 in order to detect the sign and magnitude of the difference between the actual vehicle speed and the predetermined vehicle speed, the transistor 26 becomes conductive during the period of time where the transistors 23 and 24 are simultaneously cut off, whereby outputs such as shown in FIGS. 4 and 5 are produced. FIG. 4 shows the case in which the actual vehicle speed is faster than the predetermined vehicle speed and FIG. 5 shows the case in which the actual vehicle speed is slower than the predetermined vehicle speed. FIGS. 4 and 5; (a), (b) and (c) graphically show, respectively, an actual speed responsive pulse current to be produced by the transistor 23, a predetermined speed responsive pulse current to be produced by the transistor 24, and NAND circuit output to be produced by the transistor 26, and FIG. 4(d) and FIG. 5(d) show, respectively, NAND circuit output of the transistor 27 and NAND circuit output to be produced by the transistor 28.

An example relating to the case in which the predetermined vehicle speed is faster than the actual vehicle speed will be described in the following. In this case, as will be understood from FIG. 5, cut-off time of the transistor 24 which is cut off during a period of time corresponding to the predetermined vehicle speed is shorter than the cut-off time of the transistor 23 which is cut off and made conductive in response to the actual vehicle speed. That is, in this case, the actual vehicle speed is too slow by a period of time corresponding to difference between the cut-off time of the transistor 23 and that of the transistor 24. Furthermore, NAND circuit output of the transistors 23 and 24 is introduced into the transistor 26, whereby as shown in FIGS. 4(c) and 5(c), the transistor 26 is brought into conductive state for a period of time corresponding to the cut-off time of the transistor 24, said cut-off time being shorter. Now, when outputs of the transistors 23 and 26 are introduced into the NAND circuit comprising the diodes 21, 22, resistor 12, and transistor 28, the transistor 28 becomes conductive during a period of time corresponding to difference between simultaneous cut-off time of the transistor 23 and 26, that is, corresponding to the slower degree of the actual vehicle speed than the predetermined vehicle speed, whereby a current is made to flow into the coil 39. As a result, as shown in FIG. 8, the magnetic plate 50 is attracted towards the iron core 49 and the springs 58 and 60 are contracted while the air side nozzle 62 is being closed by the valve plate 56, whereby the valve plate 55 is detached from the vacuum side nozzle 61 as shown in FIG. 8, thereby to open the nozzle 61. Accordingly, the degree of vacuum in the vacuum chamber 77 is increased so as to increase opening of the throttle valve 42, thus causing increase of the actual vehicle speed. Further, as the vehicle speed reaches a predetermined value, the width of the vehicle speed responsive pulse current (period of time when the transistor 23 is cut off) is shortened and further the period of time when the vacuum-side nozzle 61 is opened is shortened. When the vehicle speed increases too much, the transistor 27 is brought into conductive state thereby passing an electric current to the coil 38. Therefore, in contrast to the foregoing case, the vacuum-side nozzle 61 is closed by the valve plate 55, and the air-side nozzle 62 is opened by the releasing action of the valve plate 56 thereby lowering the degree of vacuum in the vacuum chamber 77 and moving the throttle valve 42 in the direction of closing itself so that the vehicle speed is decreased. A selected vehicle speed is thus maintained constant according to the above-mentioned sequence of operations. Next, the brake pedal 33 is trodden to release the condition of constant speed traveling. By this action, the valve 35 is opened to abruptly bring the pressure in the vacuum chamber 77 to be the atmospheric pressure thereby returning the throttle valve 42 to the idling position and simultaneously closing the stop switch 32. Accordingly, the potential difference between both terminals of the relay 29 is removed. This makes the relay 29 inoperative; and therefore the device is released from its electrical operation.

In the foregoing example, both the predetermined vehicle speed and the actual vehicle speed are based on the cut-off periods of pulse current, but substantially the same operation may be accomplished by basing the sequence upon the pulse conductive period also. Further, the vacuum servo-device which works at a negative pressure is employed as a servo-device which opens and closes a throttle valve, but instead of said device an electric motor may be used.

Figure 10:
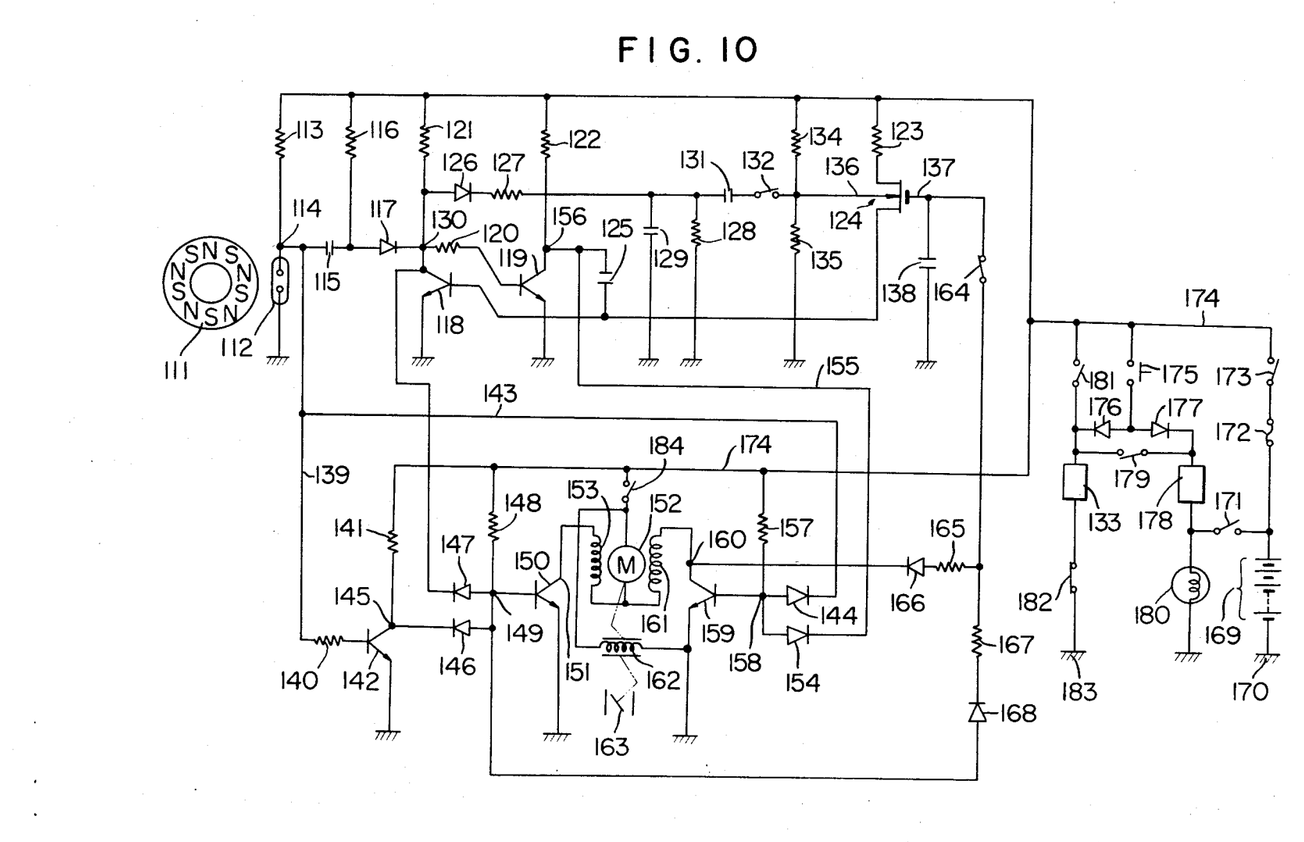
FIG. 10 is an electric circuit diagram of another embodiment of the invention.
Figures 11A, 11H:
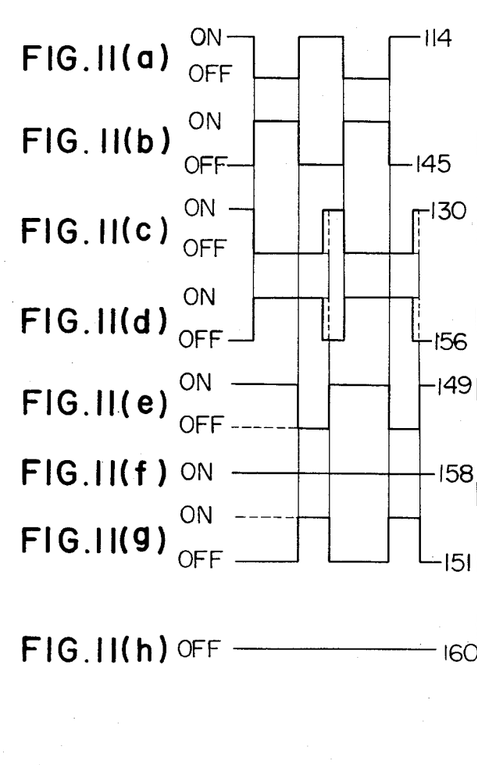
Figures 12A, 12H:
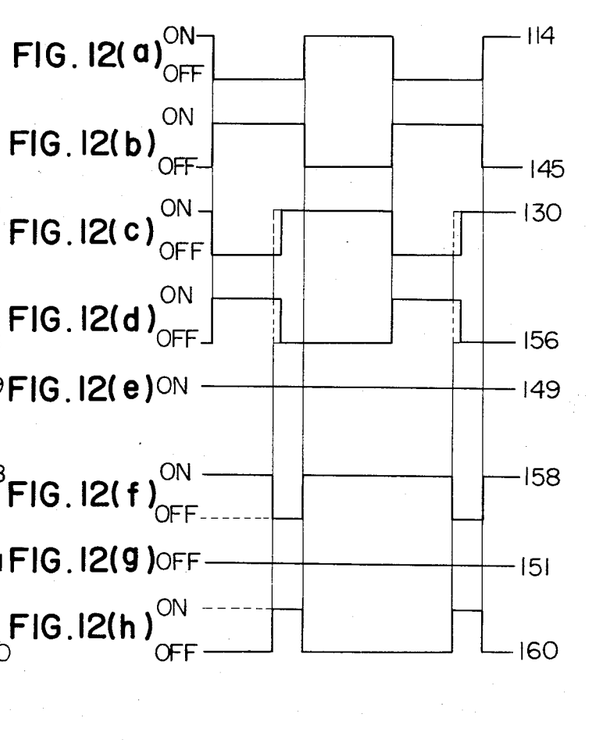

Referring now to FIGS. 10 to 12, another embodiment according to this invention will be described in the following:

In FIG. 10, a magnet 111 is provided at its circumference with poles of N and S and is connected to a speed-meter driving shaft or the like which are not shown in the figure. The magnet rotates at a speed proportional to the vehicle speed. There is provided a reed switch 112 at a position adjacent to the magnet 111 said reed switch repeating open and close operations with the rotation of the magnet 111. A nonvariable resistor 113 generates a vehicle speed responsive pulse current with the aid of the magnet 111 and the reed switch 112. Of course, the vehicle speed responsive pulse current generating mechanism may be substituted by the combination of the a.c. generator and a Schmitt circuit. One terminal of a capacitor 115 is connected to a branching point 114 and the other terminal of said capacitor is connected to a resistor 116, thereby composing a differential circuit. A diode 117 contributes to generate trigger pulses from a monostable multivibrator which is composed of transistors 118 and 119, resistors 120 to 123, capacitor 125 and an electrical field effect transistor (which will be called FET hereinafter) 124. In other words, when trigger pulses are applied to the mono-multivibrator from the diode 117, the transistor 119 is brought into conductive state from non-conductive state while the transistor 118 is brought into non-conductive state from conductive state. The above states are alternated again after a certain period of time determined by the conductive state of said FET 124. The combination of a diode 126, resistors 127 and 128, and a capacitor 129 functions so as to integrate a voltage corresponding to a vehicle speed. The faster the vehicle speed becomes, the longer the non-conductive period of time of said transistor 118 becomes; and therefore the charged voltage of said capacitor 129 increases with the increment of the vehicle speed. The apparatus comprises a capacitor 131 for differentiating the voltage responsive to the vehicle speed thereby to detect acceleration and deceleration of the vehicle, a normally open switch 132 for a relay 133, and resistors 134 and 135 adapted to apply a nonvariable bias to a second gate 136 of the FET 124. The FET 124 is to set the conductive period of the monomultivibrator depending upon the conductive state of the FET. A first gate of 137 of the FET 124 is connected to a capacitor 138. The pulse width is set by changing conductive state of the FET 124 with the aid of the electric fields relative to the second gate 136 and the first gate. The branching point 114 is connected to the NOT circuit composed of resistors 140 and 141 and a transistor 142 through a conductor 139, and to a diode 144 through a conductor 143. The collector terminal 145 of the transistor 142 and the collector terminal 130 of the transistor 118 are, respectively, connected to diodes 146 and 147 which compose an AND circuit, so as to obtain an AND output from the point 149 connecting said both diodes 146 and 147 and resistor 148. A transistor 150 whose base terminal is connected to the connecting point 149 functions as a NOT circuit of NAND output while its collector terminal 151 amplifies the electric current passing through the speed reduction side winding 153 of a throttle valve control servo-motor 152. 154 is a diode one terminal of which is connected to a collector terminal 156 of the transistor 119 through a conductor 155 while the other terminal of said diode is connected to a resistor 157. A common output terminal 158 of the diodes 144 and 145 forming an AND circuit is connected to the base terminal of the transistor 159, collector terminal 160 of said transistor 159 being connected to the speed multiplication side winding 161 of the throttle valve control servo-motor 152. The output of the throttle valve control servo-motor is applied to a throttle valve 163 through an electromagnetic clutch 162. The capacitor 138 and the first gate of the FET 124 are connected to the collector terminal 160 of the transistor 159 through a resistor 165 and a diode 166 and are also connected to the base of the transistor 150 through a resistor 167 and a diode 168, being branched through a normally closed contact 164. The capacitor 138 is adapted to be charged from the connecting point 149 and to be discharged through the collector terminal 160 of the transistor 159. An electric battery 169 is connected at its negative terminal to the ground 170 while its positive terminal is connected to one terminal of a stop switch 171 and also to one terminal of a fuse 172. The other terminal of the fuse 172 is connected to a positive bus line 174 through a main switch 173. One terminal of a normally open push button switch 175 connected to the bus line 174 and its other terminal is connected to both diodes 176 and 177. One terminal of a relay 178 is connected to the diode 177 and to the normally open contact 179 of the relay 178 while the other terminal is connected to the other terminal of the stop switch 171 and to a stop lamp 180. The relay 133 is provided with a normally open contact 181 which is positioned between the positive bus line 174 and the relay 133. One terminal of a normally closed push button switch 182 is connected to the relay 133 and the other terminal is grounded at 183. There is provided a normally opened contact 184 connected between the positive bus line 174 and the throttle valve control servo-motor 152, said throttle valve being depressed by a spring or the like so as to be at its normally closed position (idling position).

In the above-mentioned circuit, operation is as follows:

First, in a normal traveling period of time, the ignition switch 173 is closed. Accordingly, the vehicle speed pulse current generated by the reed switch 112 which is opened and closed in response to the vehicle speed attains a rectangular wave form as shown in FIG. 12a. The rectangular wave form pulse shown in FIG. 12a is obtained at the branching point 114 of FIG. 10. When this wave form is changed from ON-state to OFF-state, a trigger pulse, which makes the transistor 119 conductive and the transistor 118 non-conductive, is produced from the combination of the differential circuits 115 and 116 and the trigger diode 117. As is well known, the conductive period of time of the transistor 119 and the non-conductive period of time thereof is determined by a time constant which is obtained from the capacitor 125, resistor 123 and the combined resistance of the FET 124. Upon opening of the reed switch 112, the transistor 118 begins to be cut off and is cut off during the period of time corresponding to the predetermined vehicle speed as described later, and then becomes conductive again. In a normal traveling period of time when a constant speed traveling is not effected, the time constant is determined by the capacitor 125, resistor 123 and the combined resistance of the FET 124 so as to cut off the transistor 118 for the period of time when the reed switch 112 is opened. As the relay 133 is not energized for the normal traveling period of time, the normally open contact 132 of the relay 133 is left open and a bias fixed by the resistors 134 and 135 is imparted to the second gate 136 of the FET 124. For the earlier period after the vehicle starts traveling, the potential across the capacitor 138 is hardly built up yet, and therefore the potential of the second gate 136 of the FET 124 is greater than that of the first. Consequently, the internal resistance of the FET 124 becomes considerably high, so that the period of time when the transistor 118 is nonconductive becomes long in response to said internal resistance. Thus, the pulse current obtained by inversing the vehicle speed pulse current generated at the branching point 114 by means of the transistor 142 and the pulses generated at the collector terminal of the transistor 118 are introduced into the AND circuit composed of the diodes 146 and 147, to pick up the common nonconductive component of said both pulses, and for this period of time the capacitor 138 is gradually charged through the diode 168 and resistor 167. With increase of the potential charged in the capacitor 138, the potential applied to the first gate of the FET 124 is gradually increased, whereby the potential difference between the first and the second gates and therefore the internal resistance of the FET becomes low. Consequently, the non-conductive period of time of the transistor 118 is shortened in proportion to the electrical potential built up in the capacitor 138. When the nonconductive period of time of the transistor 118 is shortened, a narrow width pulse appears at the point 149 connecting the output terminals of the AND circuit diodes 146 and 147 and the potential built up in the capacitor 138 is gradually decreased, and when the nonconductive period of time of the transistor 118 becomes equal to that of the transistor 142, the capacitor 138 ceases to be charged so that the potential corresponding to the vehicle speed is charged to the capacitor 138. Therefore, when the vehicle speed is varied, for instance decreased, the width of the vehicle speed pulse which appears at the branching point 114 is widened, so that no output appears at the AND output point 149; and on the contrary, AND output pulses appear at the output terminal 158 of the AND circuit comprising the resistor 157 and the diodes 144 and 154 which receive the input from the collector terminal 156 of the transistor 119 and the branching point 114 for the period of time when both the transistor 119 and the reed switch 112 become nonconductive at the same time. This pulse is inversed by the transistor 159 thereby gradually discharging the electric charge of the capacitor 138 through the resistor 165 and the diode 166 connected to the collector terminal 160 of said transistor 159, thus resulting in the decrease of the electrical potential of said capacitor 138. Therefore, the potential of the first gate of the FET 124 is decreased and the conductive degree of the FET is decreased. Consequently, the nonconductive period of time of the transistor 118, that is, the conductive period of time of the transistor 119 is increased so as to coincide with the vehicle speed responsive pulse width. Thus, the potential responsive to the traveling vehicle speed is always maintained at the first gate of the FET. Consequently, when the constant speed traveling direction push button 175 is operated so as to change the traveling state from the normal traveling to the constant speed traveling, the relays 133 and 178 are energized, thereby to close the normally open contacts 132 and 181 of the relay 133, to open the normally closed contact 164, and to close the normally open contacts 179 and 184 of the relay 178. By the thus closed contacts 179 and 181, the relays 133 and 178 are kept energized even though the constant speed traveling direction push button 175 is released. By the thus opened contact 164 the vehicle speed voltage at the setting time, as described before, is memorized. As the impedance of the gate of the FET 12, as well known, is high, the potential of the capacitor 138 is hardly changed for a long period of time. After that, when the vehicle speed becomes faster than the predetermined vehicle speed memorized as above, as for instance by traveling of the vehicle on a downward slope when acceleration is also generated), the width of the vehicle speed pulse appearing at the branching point 114 is narrowed (FIG. 11a). At the same time, the pulse obtained by inversing the vehicle speed pulse appearing at the branching point 114 is obtained at the collector terminal 145 of the transistor 142 (FIG. 11B). As the normally opened contact 132 of the relay 133 is kept closed due to energization, the acceleration of the vehicle is detected by the differential circuit composed of the elements 116 and 117 and is integrated by the integration (smoothing) circuit comprising the diode 126, resistors 127 and 128, and capacitor 129, so as to charge the capacitor 131. Owing to this, the potential of the second gate 136 of the FET 124 is raised and the internal resistance of the FET becomes high, and therefore the non-conductive period of time of the transistor 118 is made longer than that of the pulse (FIG. 11c) corresponding to the predetermined vehicle speed while the conductive period of the pulse (FIG. 11d) of the transistor 119 is also made equally longer. The AND output (FIG. 11e) with respect to the nonconductive period of time of the pulses (d) (c) appears at the AND output point 149 (shown by dot lines in FIG. 11d). This AND output is inversed by the transistor 150 which acts as a NOT circuit, and at the collector terminal 151 thereof the pulse shown in FIG. 11g is produced. This pulse (g) is a differential pulse between the predetermined vehicle speed pulse (c) and the vehicle speed pulse (b) and represents the speed difference between the predetermined vehicle speed and the actual vehicle speed and the actual vehicle speed (that is, the speed at which the vehicle actually travels). Furthermore, the fact (FIG. 11f) that the actual vehicle speed is greater than the predetermined vehicle speed is discriminated by appearance of no output at the AND output point 149. When the normally open contact 184 of the relay 178 is closed by energization of said relay, the electromagnetic clutch 162 is actuated so that the throttle valve 163 is coupled to the servomotor 152 through a coupling member (not shown) provided between the throttle valve 163 and the servomotor 152, whereby the servo-motor is revolved by the speed reduction side winding which works with the speed difference pulse appearing at the collector terminal 151 of the transistor 150, thus controlling the throttle valve 163 toward the closed direction. This action is continued until the AND output disappears from the AND output point 149, in other words, until the actual vehicle speed coincides with the predetermined vehicle speed.

Next, when the actual vehicle speed becomes smaller than the predetermined vehicle speed (speed reduction is also produced) such as by the vehicle travelling on an upward slope, the width of the vehicle speed pulse is widened (FIG. 12a). At the same time a pulse obtained by inversing the vehicle speed pulse appearing at said branching point 114 is produced at the collector terminal 145 of the transistor 142 which functions as a NOT circuit (FIG. 12b). As speed reduction of the vehicle is caused, the potential at the second gate of the FET 124 is decreased, the internal resistance of the FET 124 becomes low, and the nonconductive period of time of the transistor 118 is made shorter than that of the pulse (FIG. 12c) corresponding to the predetermined vehicle speed while the conductive period of time of the pulse (FIG. 12d) of the transistor 119 is also made equally shorter. In this case, no output is produced at the AND output point 149, because there is no non-conductive part common to pulses (b) and (c) (FIG. 12e). At the output terminal 158 of the AND circuit composed of the diodes 144 and 145, a pulse (FIG. 12f) of the nonconductive part common to the pulses produced at the branching points 114 and the collector terminal 156 of the transistor 119 is produced. This pulse is inversed by the transistor 159 which functions as a NOT circuit and the pulse (shown in FIG. 12h) is produced at the collector terminal 160. This pulse (h) is a differential pulse between the predetermined vehicle speed pulse (d) and the vehicle speed pulse (a) and represents the speed difference between the predetermined vehicle speed and the actual vehicle speed. In this case, the fact that no output is present at the AND output point 149 (FIG. 12e) discriminates the fact that the actual vehicle speed is smaller than the predetermined vehicle speed. Therefore, the servo-motor 152 is revolved by the speed multiplication side winding 161 which operates with the speed difference pulse produced at the collector terminal 160 of the transistor 159, thereby controlling the throttle valve 163 toward the open direction. This action is continued until no AND output becomes produced at the AND output terminal 158, in other words until the actual vehicle speed coincides with the predetermined vehicle speed. Further, when the speed of the constant speed traveling is changed, the relays 133 and 178 are once released by operating the normally closed push button switch 182 and the vehicle speed is increased upto the desired speed by the normal accelerating operation or is decreased by operating a brake system, and then the above-described action is performed by operating the constant speed traveling, a brake pedal (not shown) is trodden to cause the stop switch 171 to be closed, the stop lamp 180 is illuminated, and the voltage difference between both terminals of the relay 178 becomes extinct thereby to deenergize the relay 178. Accordingly, the normally open contact 184 of the relay 178 is opened, the operation of the electro-magnetic clutch 162 ceases, and the throttle valve 163 is returned to the idling position by means of a spring (not shown). Release of the constant speed traveling may be accomplished by not only applying a brake pedal but also treading a clutch pedal. In the case of treading a clutch pedal for releasing the constant speed traveling, the relay 178 is de-energized, but the relay 133 is kept in energized state, and therefore the predetermined vehicle speed before applying a brake is kept memorized in the capacitor 138. Accordingly, after applying the brake so as to reduce the vehicle speed when it is required cause that the vehicle again to travel at the original speed present before applying the brake this can be achieved by operating the constant speed traveling push button 175 only.

We claim:

1. An apparatus for causing constant traveling speed of automotive vehicles, said apparatus including an accelerator pedal; which comprises, in combination, a throttle valve operated by treading said pedal thereby to vary the vehicle speed; a pulse generator for generating a pulse current responsive to the actual vehicle speed; a capacitor adapted to charge therein a potential responsive to said pulse current responsive to the vehicle speed; memory means for memorizing the potential charged in said capacitor; an electric-field effect transistor having first and second gates, said second gate being biased to a settable predetermined bias value and said first gate being supplied with the potential of said capacitor; a multivibrator which operates with said electric-field effect transistor so that said multivibrator produces a pulse current responsive to a set traveling speed after a potential responsive to the actual traveling speed has been memorized in said capacitor by operating said memory means; and a throttle valve controlling servo-device comprising a comparator for comparing said pulse current responsive to the actual vehicle speed with the pulse current responsive to the set predetermined vehicle speed and operating to close said throttle valve when said actual vehicle speed is greater than said set vehicle speed and to open said throttle valve when said actual vehicle speed is smaller than said set vehicle speed.

2. An apparatus for causing a traveling speed of automotive vehicles constant at a selectable reference speed, said apparatus including an accelerator pedal, which comprises in combination: a throttle valve operated by treading said accelerator pedal thereby to vary the vehicle speed; a pulse generator for generating a pulse current responsive to actual vehicle speed; a capacitor adapted to charge therein a potential responsive to said pulse current responsive to actual vehicle speed; memory means for memorizing the potential charged in said capacitor; an electric-field effect transistor having first and second gates, said second gate being supplied with a potential obtained by integrating said pulse current responsive to said actual vehicle speed and said first gate being supplied with the potential of said capacitor, said transistor operating to vary width of each pulse of said pulse current responsive to said reference speed of the vehicle thereby, when the vehicle speed deviates from the set speed, to vary pulse-width difference between said pulse current responsive to actual vehicle speed and said pulse current responsive to said set vehicle speed in accordance with magnitude of said difference; a multivibrator which cooperates with said electric-field effect transistor so that said multivibrator produces a pulse current responsive to said reference speed after a potential responsive to the actual traveling speed has been memorizing in said capacitor by operating said memory means; and a throttle valve controlling servo-device comprising a comparator adapted to compare said pulse current responsive to the actual vehicle speed with the pulse current responsive to the set predetermined vehicle speed and to operate so as to close said throttle valve when said actual vehicle speed is greater than said vehicle speed and to open said throttle valve when said actual vehicle speed is smaller than said set vehicle speed.

3. A method of causing a traveling speed of an automotive vehicle constant at a selectable reference speed, which comprises the steps of:
generating a pulse current responsive to an actual vehicle speed;
operating a switch means to select a reference speed at which the vehicle is running to begin with and which reference speed is required to be maintained;
memorizing a pulse current corresponding to the set reference vehicle speed;
comparing upon a change of vehicle speed a newly produced pulse current corresponding to the changed vehicle speed with the memorized pulse current so as to produce a compared result as a difference of pulse widths of the two pulse currents being compared;
and applying the compared result as a speed restoring signal to the vehicle for a period of time corresponding to said difference of pulse widths, to restore the changed vehicle speed to the reference speed.

4. A method of causing a traveling speed of an automotive vehicle constant at a selectable reference speed, which comprises the steps of:
generating a first pulse current having a pulse width representative of actual vehicle speed;
operating a selecting means so as to select a reference speed at which it is desired to maintain the vehicle speed and generating a second pulse current having a pulse width representative of the selected reference speed;
detecting acceleration and deceleration of the vehicle;
varying the width of said second pulse current in response to detected acceleration and deceleration of the vehicle in such a manner that said width is made shorter with an increase of the acceleration and is made longer with an increase of the deceleration;
comparing the width of said first pulse current with the width of the varied second pulse current and producing a signal representative of the difference of pulse widths of the two pulse currents being compared; maintaining said result signal being produced for a predetermined period of time representative of and fixed by said comparison;
and applying the compared result signal as a speed restoring signal to the vehicle for said predetermined period of time to restore a changed vehicle speed to the selected reference speed.

5. An apparatus for causing a traveling speed of an automotive vehicle having an accelerator pedal and a throttle valve coupled thereto, constant at a selected desired reference speed, which comprises:

a pulse generator means for generating a first pulse current signal having a variable pulse width representative of an actual vehicle speed;
a monostable multivibrator means for generating a second reference pulse-current signal having a pulse width representative of a selected reference vehicle speed;
a comparator means for comparing said pulse currents and producing a resultant signal representative of the difference between said first pulse current signal and said second reference pulse-current signal; means for maintaining said resultant signal for a time duration proportional to the difference between said first pulse current signal and said second reference pulse current signal;
means to limit application of said resultant signal as a vehicle-speed restoring signal for a period of time proportional to a pulse width difference between said first and second signals;
and a servo-device means for controlling said throttle valve in such a manner that said first signal is made to be coincident with said second reference signal for a period of time equal to said time duration, so as to restore the actual vehicle speed to the selected reference speed without any attendant hunting phenomenon.

6. An apparatus for causing a traveling speed of an automotive vehicle having an accelerator pedal and a throttle valve coupled thereto, constant at a selected desired reference speed, which comprises:
a pulse generator means for generating a pulse current signal having a first pulse width representative of the actual vehicle speed;
a monostable multivibrator means for generating a second reference pulse current signal having a variable pulse width representative of a selected reference speed;
a differentiating circuit for detecting acceleration and deceleration of the vehicle and having an output;
a time-constant varying circuit means for varying a time-constant of said multivibrator means in response to the output of said differentiating circuit, thereby to vary width of said pulse current responsive to the set reference vehicle speed, said time-constant varying circuit effecting a decrease of said time-constant with increase of acceleration of the vehicle speed and effecting an increase of said time-constant with increase of deceleration of the vehicle speed;
a comparator for comparing said first signal with said second reference pulse current signal and producing a compared resultant signal representative of the difference between pulse widths of said first and second signals;
means to limit the time duration of application of said resultant signal as a vehicle-speed restoring signal, for a period of time proportional to a pulse width difference between said first and second signals; and
a servo-device for controlling said throttle valve in such a manner as to restore a changed vehicle speed to the selected reference vehicle speed.

* * * * *